Patented Mar. 29, 1938

2,112,688

UNITED STATES PATENT OFFICE 2,112,688

FLY SPRAY

Euclid W. Bousquet, Wilmington, and Paul L. Salzberg, Edge Moor, Del., assignors, by mesne assignments, to E. I. du Pont de Nemours & Company, Wilmington, Del., a corporation of Delaware No Drawing. Application October 24, 1934, Serial No. 749,812

7 Claims. (Cl. 167—22)

The present invention refers to fly sprays and comprises compositions of matter in which esters of the —(CNS) acids are the active ingredients, particularly those esters in which the ester group is derived from an aliphatic alcohol of at least 6 carbon atoms, and more particularly those fly spray compositions containing more than one of said esters and still more particularly those fly spray compositions in which the various active esters contained therein are of different activity or toxicity against winged insects of the type generally called flies.

We have shown in our application Ser. No. 649,449, filed December 29, 1932, which has since matured into Patent No. 1,993,040 of March 5, 1935, that higher alkyl thiocyanates, and isothiocyanates, that is to say esters of the —(CNS) acids are eminently suited to combat parasites, especially insect pests.

We have, for instance, shown that the thiocyanates and isothiocyanates of alcohols such as 2-methylpantanol-1;
4-methylhexanol-1;
octyl alcohol;
2,4-dimethylhexanol-1;
2,6-dimethylhexanol-1;
nonyl alcohol;
decyl alcohol;
cetyl alcohol;
2,6-dimethyloctanol-1;
stearyl alcohol (octadecyl alcohol);
oleyl alcohol;
carnaubyl alcohol;
melissyl alcohol;
lauryl alcohol (dodecyl alcohol);
sec. dodecanol;
2,4,6-trimethyl dodecanol;
2,4,6,8-tetramethyl dodecanol;

and other aliphatic alcohols up to for instance 24 and even more carbon atoms have specific toxicity against insects which renders them useful as insecticides.

We have found that the efficiency of the thiocyanates and isothiocyanates of these and other alcohols of the same group and similar composition against winged insects is greatly improved if the compositions used for spraying the winged insects contain more than one of said compounds.

In measuring the efficiency of insecticidal sprays against winged insects such as house flies one usually counts the insects paralyzed 10 minutes after application of a kerosene solution of the insecticide and again counts the number of insects killed after 24 hours, in comparison with the number of insects paralyzed or killed by a pyrethrum-kerosene spray.

We have found that some of the thiocyanates and isothiocyanates derived from aliphatic alcohols containing at least 6 carbon atoms have a higher efficiency on producing initial paralysis of the winged insects but that their efficiency for final kill is proportionately lower, and that others while having a relatively low efficiency in initial paralysis have a remarkably greater efficiency in the final kill test.

For purpose of simplicity we shall in the following call the effect as observed on flies for the first 10 minute period as paralytic effect and the effect observed after the 24 hour period as lethal effect and call high paralytic effect and high lethal effects respectively the results which in comparative tests approximate or exceed the results obtained with pyrethrum.

It appears from our observations and experience that thiocyanates and isothiocyanates of alcohols of less than 10 carbon atoms have a higher initial paralytic effect with a relatively lower final kill, whereas thiocyanates and isothiocyanates of more than 10 carbon atoms in the alkyl radical have a higher final kill than an initial paralytic effect. In other words alkyl thiocyanates and alkyl isothiocyanates in which the alkyl radical contains less than 10 carbon atoms have a high paralytic effect, whereas alkyl thiocyanates and alkyl isothiocyanates in which the alkyl radical contains more than 10 carbon atoms have a high lethal effect. In other words alkyl thiocyanates having a molecular weight of 185 (that of nonyl thiocyanate) or less are of high paralytic and low lethal effect, and compounds of a molecular weight of 213 (that of undecyl thiocyanate) and higher have a low paralytic and high lethal effect.

Decyl thiocyanates in which the alkyl radical contains 10 carbon atoms has an intermediate position in that both its paralytic and final killing effect are high and it is therefore well suited as a parasiticide against winged insects.

We have also found that the combined high efficiency of decyl esters can be duplicated if we combine into a single spray an ester of high paralytic effect with an ester of high lethal effect, that is to say esters of an alcohol containing less than 10 carbon atoms are admixed with substantial amounts of one or more esters of an alcohol of 10 or more carbon atoms, or an ester of more than 10 carbon atoms is mixed with a substantial amount of a decyl ester or an ester of less than 10 carbon atoms, or an ester of less than 10 carbon atoms is mixed with an ester of more than 10 carbon atoms. When using such mixtures it is advisable to show the proportions in such a manner that the mean molecular weight of the mixture is between that of the nonyl and undecyl derivatives.

Fly sprays of both high paralytic and high lethal effects are, for instance, obtained by mixing a methyl-pentanol ester with a decyl ester, or a decyl thiocyanate is mixed with dodecyl thiocyanate, or octadecyl thiocyanate is mixed with octyl thiocyanate.

Decyl thiocyanate is under ordinary conditions, when pure, a colorless oily, water insoluble liquid, having a slight fatty odor, the objectionable odor of lower thiocyanate being almost completely masked. Decyl thiocyanate boils at 122° C. under 2 millimeters pressure. Its formula is $C_{10}H_{21}$—SCN.

In the table below we are giving the results of fly spray tests according to the standard Peet-Grady testing method as adopted by the Association of Disinfectants and Insecticide Manufacturers of the United States. In this test the efficiency of the material to be tested is compared with the efficiency of a pyrethrum extract containing 125 mg. of pyrethrins 1 and 2 per 100 cc. of kerosene. This extract gave 100% down after 10 minutes and 63.3% dead after 24 hours.

We employed a 3% solution of the thiocyanates in kerosene in these tests.

| No. | Material tested | Paralytic effect | Lethal effect |
|---|---|---|---|
|  |  | Percent | Percent |
| 1 | Octyl thiocyanate MW 171 | 99 | 60.8 |
| 2 | Decyl thiocyanate MW 199 | 100 | 116.7 |
| 3 | Dodecyl thiocyanate MW 227 | 92 | 87.7 |
| 4 | Technical dodecyl-tetradecyl thiocyanate (mean MW 241) | 77 | 108.5 |
| 5 | Technical octyl-decyl thiocyanate (mean MW 178.5) | 100 | 81.8 |
| 6 | Thiocyanate from total coconut alcohols (mean MW 239) | 89 | 133.0 |

The mixture of test #4 was obtained by thiocyanating the middle fraction of alcohols obtained by hydrogenating coconut oil, and contains in addition to dodecyl and tetradecyl alcohols minor amounts of lower and higher alcohols.

The mixture of test #5 was obtained by thiocyanating the "foreshots" obtained in the rectification of technical dodecyl alcohol. These "foreshots" consist predominantly of octyl alcohol with smaller quantities of decyl alcohol.

The relative efficiencies of mixtures of octyl and decyl thiocyanates are given in the following table in which a total thiocyanate concentration of 5% was used, the results being averages of 4 tests each. The pyrethrum standard gave 99% down after 10 minutes and 69% kill after 24 hours.

| No. | Octyl thiocyanates | Decyl thiocyanate | Paralytic effect | Lethal effect |
|---|---|---|---|---|
|  | Percent |  | Percent | Percent |
| 1 | 1 | 4% mean MW 191 | 101 | 126.6 |
| 2 | 2 | 3% mean MW 187.8 | 101 | 123.0 |
| 3 | 4 | 1% mean MW 176.6 | 101 | 89.5 |

The relative efficiencies of mixtures of octyl thiocyanate with technical dodecyl-tetradecyl thiocyanates are given below, using a total concentration of 5%, the results being averages of 6 tests each.

| No. | Octyl thiocyanates | Dodecyl-tetradecyl thiocyanate | Paralytic effect | Lethal effect |
|---|---|---|---|---|
|  | Percent |  | Percent | Percent |
| 1 | 2 | 3% mean MW 213 | 97.7 | 130.0 |
| 2 | 3 | 2% mean MW 199 | 101.1 | 108.0 |

It is seen that in order to obtain both high paralytic and lethal effects it is desirable to use a thiocyanate or mixtures of thiocyanates having a mean molecular weight between those of undecyl and nonyl thiocyanates. In general decyl thiocyanate has surprisingly given somewhat better results than mixtures which approximate this compound in mean molecular weight.

It will be understood that the above tests are given for illustrative purposes only. Similar differences in the efficiency of the derivatives of alcohols of less than 10 and more than 10 carbon atoms will be found in comparing other compounds of these classes and that likewise other mixtures of these groups of compounds will show similar improvements. It was also found that the efficiency of a compound of either group is enhanced if it is applied as an insecticide in admixture with decyl thiocyanate. In other words addition of a decyl derivative to a derivative of an alcohol of more than 10 carbon atoms will produce an all around efficient fly spray the same as it did when added to octyl thiocyanate or other thiocyanates of an alcohol of from 6 to 9 inclusive carbon atoms.

Our novel compositions are applied as fly sprays in a manner similar to what is being done with pyrethrum or other insecticides used for combating winged insects. We preferably dissolve our esters in kerosene but other organic solvents can be used to dissolve or suspend these esters. We may also use aqueous suspension of these esters with spreading, emulsifying or wetting agents as desired.

We claim:

1. A fly spray comprising an aliphatic ester of the formula (CNS)—R, in which R is an aliphatic radical of at least 6 carbon atoms, said fly spray being characterized by a high paralytic and a high lethal effect, said fly spray being further characterized in that if the said radical R contains a number of carbon atoms different from 10, there is also present in said fly spray a substantial amount of another ester of the formula (CNS)—R, in which the radical R contains a different number of carbon atoms, and if the radical of said first ester contains less than 10 carbon atoms, the radical of said other ester contains at least 10 carbon atoms, and if the radical of said first ester contains more than 10 carbon atoms the radical of said other ester contains not more than 10 carbon atoms, the mean molecular weight of aliphatic ester being about 185 to 213.

2. A fly spray comprising an aliphatic thiocyanate in which the aliphatic radical contains at least 6 carbon atoms, said fly spray being characterized by a high paralytic and a high lethal effect, said fly spray being further characterized in that if said aliphatic radical contains a number of carbon atoms different from 10 there is also present in said fly spray a substantial amount of another aliphatic thiocyanate and if the aliphatic radical of said first thiocyanate contains less than 10 carbon atoms the radical of said other thiocyanate contains at least 10 carbon atoms, and if the radical of said first thiocyanate contains more than 10 carbon atoms, the radical of said other thiocyanate contains not more than 10 carbon atoms, the mean molecular weight of aliphatic thiocyanates being about 185 to 213.

3. A fly spray comprising an active ingredient having a mean molecular weight greater than 185 but smaller than 213, said active ingredient being composed of at least one alkyl thiocyanate, the chemical constitution of said active ingredient corresponding to that of alkyl thiocyanates in which the alkyl radical contains at least 8 but not more than 14 carbon atoms.

4. A fly spray comprising a substantial amount of decyl thiocyanate, said fly spray having a high paralytic and a high lethal effect.

5. Decyl thiocyanate which under ordinary conditions is a colorless oily, water insoluble liquid, boiling at about 122° C. under 2 millimeters pressure.

6. A fly spray comprising a mixture of octyl thiocyanate and of decyl thiocyanate, said mixture containing not less than twenty per cent nor more than eighty per cent of octyl thiocyanate.

7. A fly spray comprising a mixture of substantial amounts of octyl thiocyanate and of lauryl thiocyanate, said thiocyanates being in such proportions as to give a mean molecular weight between about 185 and 213.

EUCLID W. BOUSQUET.
PAUL L. SALZBERG.